United States Patent
Waltrich

[15] 3,704,875
[45] Dec. 5, 1972

[54] REMOVAL OF MERCURY FROM EFFLUENT STREAMS

[72] Inventor: Paul Francis Waltrich, Hatboro, Pa.

[73] Assignee: Pennwalt Corporation, Philadelphia, Pa.

[22] Filed: July 1, 1971

[21] Appl. No.: 158,753

[52] U.S. Cl. .........................266/15, 75/81, 210/26, 210/30
[51] Int. Cl. .........................C22b 9/04, C22b 43/00
[58] Field of Search .....210/26, 30; 266/9, 15; 75/63, 75/81

[56] References Cited

UNITED STATES PATENTS 3,615,372  10/1971  Braithwaite ...............................75/81

*Primary Examiner*—Gerald A. Dost
*Attorney*—Stanley Bilker

[57] ABSTRACT

Apparatus for treatment of effluent streams containing very low concentrations and even trace amounts of mercury in both elemental form and as mercuric ion. The stream is passed through a closed vessel having a bed of reactive metal particles, such as Zinc, magnesium and aluminum, and iron, so that the mercury forms an amalgam on the metal surface. The bed is regenerated and the mercury recovered by heating the bed while the vessel is under vacuum and condensing the vaporized mercury. The lower temperature permitted by the reduced pressure and the absence of air precludes oxidation and clumping of the metal granules.

5 Claims, 2 Drawing Figures

PATENTED DEC 5 1972 3,704,875

INVENTOR
PAUL F. WALTRICH

BY
*Stanley Bilker*
ATTORNEY

REMOVAL OF MERCURY FROM EFFLUENT STREAMS

This invention relates to an apparatus for recovery of mercury from industrial effluent streams containing trace amounts of mercury in its elemental state and also in its dissolved ion form. More particularly, the present invention concerns the removal of mercury in the waste and wash streams from plants, such as those employing mercury cells for electrolytic production of chlorine and caustic soda from brine.

Mercury contamination of industrial wash streams has been recognized as a serious pollutant factor in present day industry. During the operation of electrolytic cells of the mercury cathode type, small amounts of the metallic mercury becomes dissolved in or is entrained in the spent brine as well as in the caustic itself. Leakages in hoses, glands and seals results in a portion of this mercury containing brine to fall upon the plant floor where it is washed down into sumps. Periodic wash downs of the cells themselves to clean out mercury butter and sludge in addition to accidental spillages of the mercury itself, all contribute to the contamination of the effluent wash streams. Other sources of mercury contamination are produced in the vapor during dechlorination and in other process steps including filter backwashing. These combined waste and wash water streams may result in sewer discharges of from 100 to 1500 gallons per minute of effluent containing up to 50 parts per million of mercury.

Previous methods for removal of mercury from such effluents included; 1) contacting the brine with ion exchange resins, 2) subjecting the effluent to action of a soluble sulfide to effect precipitation, 3) contacting the effluent with coated plastic and other inert packing materials and 4) subjecting the stream to contact with reactive metal particles in an open bed or tower so that the mercury would form an amalgam with the reactive metal. However, the first three prior mentioned systems are quite complex in technology and require a great deal of equipment which necessitates appreciable capital expenditures and high operating costs. The fourth of the aforementioned prior systems has produced inefficiencies in operation because of the constant need to replace the reductor metal as a result of its being dissipated and oxidized during treatment and regeneration. It is also to be noted that ion exchange processes ultimately wind up with mercury contaminated resin which in itself leads to a disposal problem.

The present invention contemplates the use of a particulate reactive metal bed which is contained in a closed vessel and through which the effluent stream is directed such that its dissolved and/or entrained mercury reacts in passing through the bed to form an amalgam with the reactive metal. Thereafter, the vessel is subjected to a reduced pressure under relatively high vacuum conditions while the bed itself is heated. The mercury which is vaporized is condensed and recovered at an extremely high degree of purity by virtue of the high vacuum distillation. The fact that the regeneration is performed under vacuum permits distillating at lower temperatures than if accomplished atmospherically. More importantly, the absence of oxygen under vacuum conditions prevents oxidation of the reactive metal so that the bed may be used and regenerated almost indefinitely.

It is therefore, an object of this invention to provide an apparatus for removal of mercury for effluent streams and to recover the mercury in a from state of purity.

Another object of this invention is to provide an apparatus for removal of mercury from effluent streams without producing a mercury contaminated waste product.

Another object of this invention is to provide an apparatus for treating effluent streams containing trace amounts of mercury by subjecting the dissolved and/or entrained mercury to contact with a bed of particulate reactive metal so as to form an amalgam followed by regeneration of the bed with recovery of the mercury all at optimum efficiencies.

Other objects of this invention are to provide an improved device of the character described which is easily and economically produced, sturdy in construction and both highly efficient and effective in operation.

With the above and related objects in view, this invention consists of the details of construction and continuation of parts as will be more fully understood from the following detailed description when read in conjunction with the accompanying drawing in which.

Referring now in greater detail to the drawings in which similar reference characters refer to similar parts, the apparatus of the present invention comprises a closed tank, generally designated as A, in which there is included a bed of reactive metal particles, generally designated as B.

Figure 1:
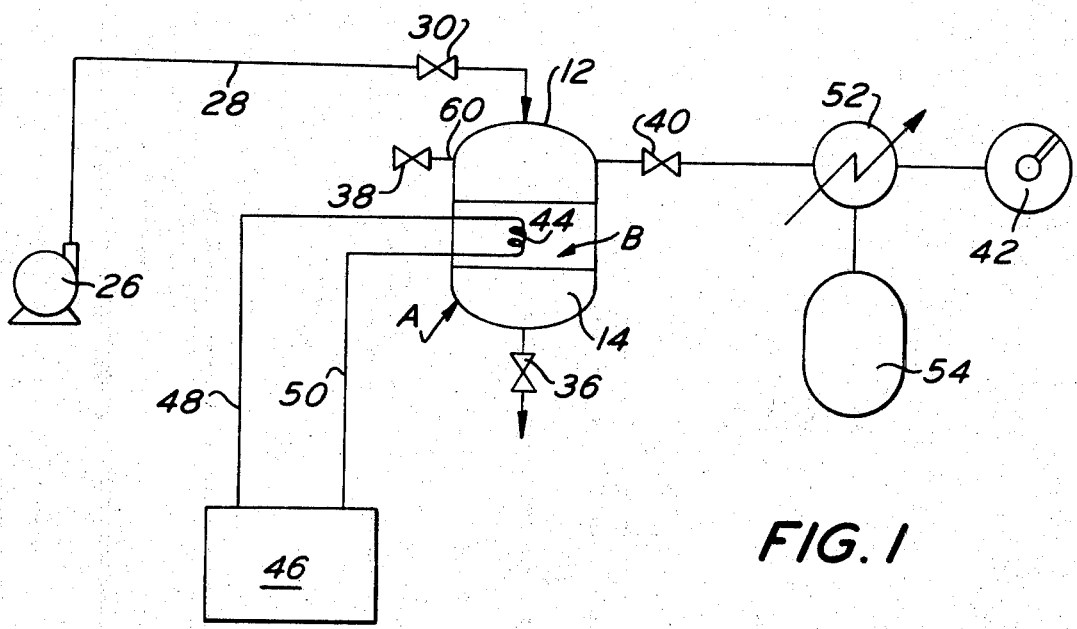
FIG. 1 is a process flow diagram illustrating the principles of this invention.
Figure 2:
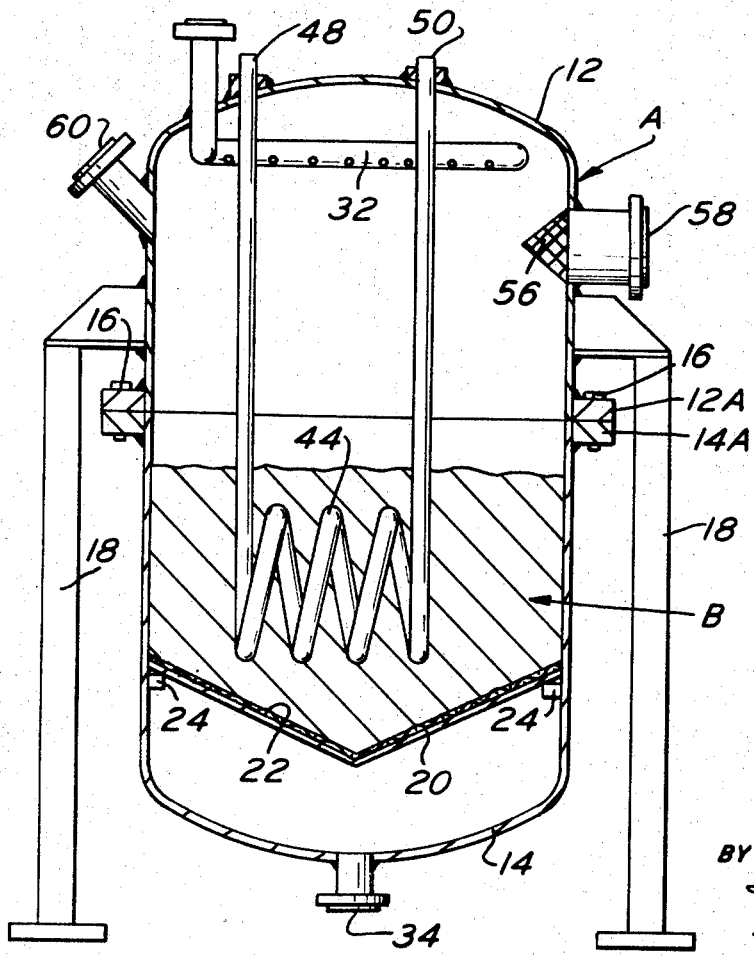
FIG. 2 is a sectioned elevational view of a reactor vessel embodying this invention.

The tank A is essentially a cylindrical steel or stainless vessel made up of two halves 12 and 14 which are secured together by passing a plurality of circumferentially spaced bolts 16 through opposed mating flanges. The vessel includes opposing domed ends and is designed for full vacuum service at an operating temperature of 650°F. A plurality of legs 18 are welded to the upper portion to permit the tank to be conveniently stood upon the floor.

The bed B is made up of particulated reactive metal, such as iron, zinc, magnesium or aluminum, supported transversely by means of a foraminous conically shaped plate 20. A fine mesh screen 22 lines the upper surface of the conical plate 20 and prevents the passage of very fine metal particles through the plate. The plate 20 is suspended peripherally by resting upon an internal bead or ledge elements 24 welded to the interior of the lower shell 14. The depth of the bed B is a function of the effluent flow rate, and the concentration of the mercury in the incoming stream as well as the final concentration to be achieved. Nominally the depth of the bed could range from 4 inches to 24 inches deep.

The mercury-containing effluent is carried from a sump by means of a pump 26 through pipe 28 and valve 30 into the vessel A. A perforated pipe coil 32 or spray head distributes the stream evenly over the surface of the bed. The effluent flows through the bed B and after treatment is discharged through outlet port 34 and valve 36.

The incoming mercury concentration in the effluent from a typical chlor-alkali plant is relatively low and may not exceed 5 to 10 parts per million. It is the design of the instant process to reduce the mercury concentration after treatment to no more than 5 to 10 parts per billion. It is to be observed that the reactive metal will react as a reducing agent where the mercury in the stream is dissolved in the form of mercuric ion. In such a case, the mercury will be precipitated as mercury metal which will then form an amalgam with the reductor metal in the bed. Should the stream contain mercury in the form of entrained elemental mercury, it will directly form an amalgam with the reactive metal surface.

Taking zinc as the example of reductor or reactive metal being used in the bed, for each pound of mercury removed from the stream, stoichiometrically 0.33 pound of zinc is consumed. However, long before the reactive zinc metal is consumed to any great extent, the active surface area will have become depleted by the formation of the zinc amalgam at the surface of the metal guanules. At this stage, it will become necessary to regenerate the bed.

Effluent valves 30 and 36 are closed in that order after having allowed most of the treated effluent which still remains in the vessel to drain through port 34. Bleed valve 38 may have been cracked to facilitate draining when inlet valve 30 was closed. Bleed valve 38 is then shut, vacuum valve 40 is opened and the interior of the vessel A pumped down by vacuum pump 42 to a reduced pressure of 10 Torr or less preferably in the range of 0.5 to 2.0 Torr. Thereafter, the reactive bed is heated to a temperature of approximately 450°F to 650°F by passing a hot fluid, such as heated oil, through a coil 44 enclosed in the bed B. A single external heating source 46 may circulate hot oil to a plurality of separate units by way of suitable piping 48–50. The mercury vapor which is evolved from the amalgam at the elevated temperature and reduced pressure is condensed within water cooled plates of a finned condenser 52 to be trapped out and stored in a high state of purity within receiver 54 prior to return to the mercury cathode feed. A conical fine mesh screen 56 is incorporated in the vacuum part 58 to prevent metal dust in the reactive metal from being drawn into the vacuum system during initial stages of evacuation.

In the event that the metal bed B becomes clogged with solid waste material, the vessel A can be disassembled at the parting flange 12a–14a. The lower shell 14 is then free to permit removal and disposal of the reactive metal granules. After reassembly, a fresh charge of reactive metal may be introduced through port 60.

It is thus apparent that the mercury which is recovered during regeneration is of a high grade of purity in view of the high vacuum distillation. All of the mercury is removed from the effluent in a re-usable state, unlike ion-exchange processes where the spent ion-exchange material is necessarily mercury contaminated, a condition presenting further disposal problems. Since the regeneration of the present system is performed under vacuum, a lower distillation temperature is afforded. Furthermore, the absence of air during vacuum distillation avoids oxidation of the reactive metal such as to prevent almost indefinite repetitive use.

Although this invention has been described in considerable detail, such description is intended as being illustrative rather than limiting since the invention may be variously embodied without departing from the spirit thereof, and the scope of the invention is to be determined as claimed. For example, it may prove desirable in certain situations to flow the effluent upwardly through the bed rather than the vertical fall described hereinbefore.

What is claimed is:

1. Apparatus for treatment of effluent streams containing small amount of elemental mercury and/or mercuric ions for removal of mercury therefrom comprising:
   a closed vessel including a valved inlet port for introducing the streams into the vessel and a valved outlet port for discharging the stream treated therein;
   means for supporting a bed of particulate reactive metal transverse to the flow of the stream within said vessel whereby the mercury ions and elemental mercury in the stream will form an amalgam upon the surface of the reactive metal particles;
   means for heating the bed of reactive metal to a temperature at which mercury in the amalgam will be vaporized; and
   means for applying a vacuum to the interior of said vessel, including means for condensing vaporized mercury to recover and store liquid mercury outside the vessel.

2. The apparatus of claim 1 wherein said reactive metal is selected from the group consisting of zinc, iron, magnesium and aluminum.

3. The apparatus of claim 2 wherein said means for supporting constitutes a foraminous plate of conical configuration.

4. The apparatus of claim 3 including a spray pipe for uniformly distributin the stream entering through the inlet port over the bed.

5. The apparatus of claim 4 wherein said means for heating comprises a coil, and means to pump a hot fluid medium through said coil.

* * * * *